(12) United States Patent
Chai et al.

(10) Patent No.: US 10,791,369 B2
(45) Date of Patent: Sep. 29, 2020

(54) CONTENT RECOMMENDATIONS USING PERSONAS

(71) Applicant: OpenTV, Inc., San Francisco, CA (US)

(72) Inventors: Crx K. Chai, Oakland, CA (US); Alex Fishman, San Francisco, CA (US); Danielle Maslow Zimmerman, East Palo Alto, CA (US); Robert Chen, Mountain View, CA (US); David Daniel Kempe, San Jose, CA (US); Colin Shengcai Zhao, Sunnyvale, CA (US)

(73) Assignee: OPENTV, INC., San Francisco, CA (US)

( * ) Notice: Subject to any disclaimer, the term of this patent is extended or adjusted under 35 U.S.C. 154(b) by 0 days.

(21) Appl. No.: 15/694,296

(22) Filed: Sep. 1, 2017

(65) Prior Publication Data

US 2018/0070138 A1    Mar. 8, 2018

Related U.S. Application Data

(60) Provisional application No. 62/383,315, filed on Sep. 2, 2016.

(51) Int. Cl.
*H04N 21/466* (2011.01)
*G06F 16/435* (2019.01)
(Continued)

(52) U.S. Cl.
CPC ....... *H04N 21/4668* (2013.01); *G06F 16/435* (2019.01); *H04N 21/4312* (2013.01);
(Continued)

(58) Field of Classification Search
CPC .......... H04N 21/4668; H04N 21/4312; H04N 21/44222; H04N 21/4532; H04N 21/4756
See application file for complete search history.

(56) References Cited

U.S. PATENT DOCUMENTS 6,947,922 B1    9/2005  Glance
9,703,838 B1 *  7/2017  Hampson .......... G06F 16/24578
(Continued)

OTHER PUBLICATIONS

"European Application Serial No. 17189129.4, Extended European Search Report dated Nov. 28, 2017", 8 pgs.
(Continued)

*Primary Examiner* — Yassin Alata
(74) *Attorney, Agent, or Firm* — Schwegman Lundberg & Woessner, P.A.

(57) ABSTRACT

Systems and methods for generating and displaying groupings of content recommendations using personas are provided. The system determines content for each of the plurality of personas. The determined content for each of the plurality of personas comprises content that shares a common genre or theme for each persona. The system populates each of the plurality of personas using the determined content for each of the plurality of personas. The system then causes display of at least some of the plurality of personas on a viewing device of a user. The at least some of the plurality of personas is selected for the user based on device data corresponding to the user, whereby the device data indicates user preferences and interactions with previous content.

20 Claims, 11 Drawing Sheets

(51) Int. Cl.
  *H04N 21/431*  (2011.01)
  *H04N 21/442*  (2011.01)
  *H04N 21/45*   (2011.01)
  *H04N 21/475*  (2011.01)

(52) U.S. Cl.
  CPC ... *H04N 21/44222* (2013.01); *H04N 21/4532* (2013.01); *H04N 21/4756* (2013.01)

(56) References Cited

U.S. PATENT DOCUMENTS

| | | | |
|---|---|---|---|
| 2002/0078029 A1* | 6/2002 | Pachet | G06F 17/30017 |
| 2010/0095212 A1 | 4/2010 | Torrens et al. | |
| 2011/0302158 A1 | 12/2011 | Sanders | |
| 2012/0143911 A1 | 6/2012 | Liebald et al. | |
| 2013/0047084 A1 | 2/2013 | Sanders et al. | |
| 2014/0040760 A1* | 2/2014 | Randell | G06F 17/30029 |
| | | | 715/745 |
| 2014/0123031 A1 | 5/2014 | Postrel | |
| 2016/0360253 A1* | 12/2016 | Busey | H04N 21/26258 |

OTHER PUBLICATIONS

"European Application Serial No. 17189129.4, Response filed Sep. 7, 2018 to Extended European Search Report dated Nov. 28, 2017", 12 pgs.

"European Application Serial No. 17189129.4, Communication Pursuant to Article 94(3) EPC dated Mar. 3, 2020", 6 pages.

Kagita, Venkateswara Rao, "Virtual User Approach for Group Recommender Systems Using Precedence Relations", Information Sciences, vol. 294, (Feb. 1, 2015), 16 pages.

\* cited by examiner

CONTENT RECOMMENDATIONS USING PERSONAS

RELATED APPLICATION

The present application claims the priority benefit of U.S. Provisional Patent Application Ser. No. 62/383,315, filed on Sep. 2, 2016 and entitled "Content Recommendations Using Personas," which is incorporated herein by reference.

FIELD

The present disclosure generally relates to machines configured to the technical field of special-purpose machines that facilitate display of digital content including computerized variants of such special-purpose machines and improvements to such variants, and to the technologies by which such special-purpose machines become improved compared to other special-purpose machines that facilitate display of digital content. In particular, the present disclosure addresses systems and methods for generating and displaying groupings of content recommendations using personas that are customized to a user based on device data corresponding to the user.

BACKGROUND

Conventionally, a user may search or browse for content. However, results are typically presented to the user without context. As a result, the user may perceive the results as being not as relevant to the user.

BRIEF DESCRIPTION OF DRAWINGS

Various ones of the appended drawings merely illustrate example embodiments of the present invention and cannot be considered as limiting its scope.

DETAILED DESCRIPTION

Figure 1:
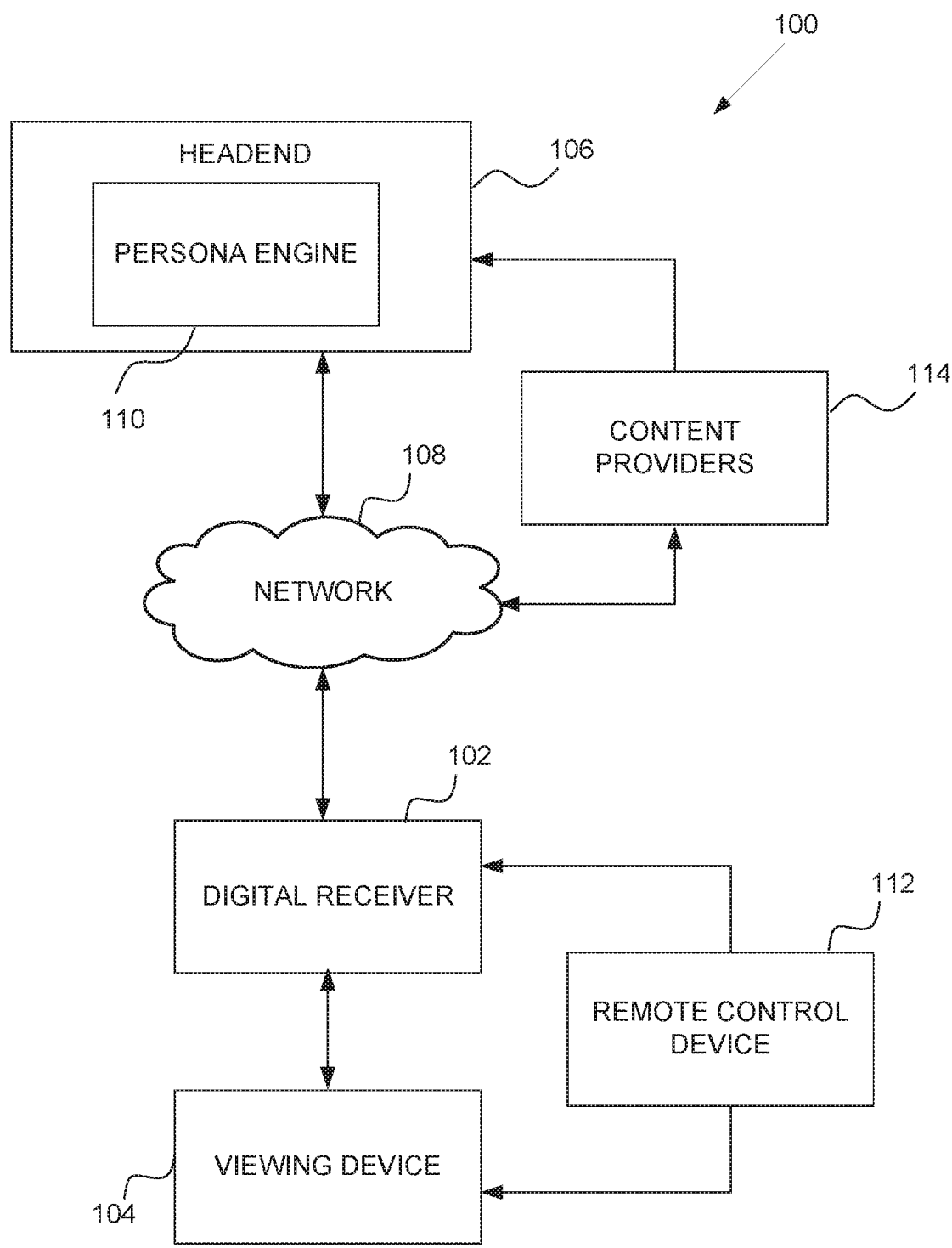
FIG. 1 is a diagram illustrating an example environment for determining and presenting content recommendations using personas in accordance with an example embodiment.

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments described herein provide systems and methods for generating and displaying groupings of content recommendations using personas. Each persona represents a character with a particular interest that influences content (e.g., recommendations) that the persona has in their watchlist. For example, if the persona is Gourmet Girl, then the content that Gourmet Girl watches, and that which is being recommended to a user, are directed to cooking such as cooking reality shows, cooking instructional shows, movies with cooking themes, or any other type of cooking related content. In another example, if the persona is Anime Alan, then the content in the watchlist of Anime Alan, and that which is being recommended to the user, are directed to anime themed content (e.g., television shows, movies, videos). In some embodiments, selection of a piece of content from a watchlist of a persona results in display (e.g., playback) of the program or piece of content without any further user interaction. In other embodiments, selection of the piece of content causes display of a detailed content view (e.g., media view) or purchase page for the program or piece of content.

As a result, one or more of the methodologies described herein facilitate solving the technical problem of generating user interfaces with recommendations that are grouped in a specific way so that users perceive the results as being more relevant to their interests. The methodologies include selecting a plurality of personas to populate and determining content for each persona of the plurality of personas. The logic then populates each persona with their respective determined content (e.g., content recommendations), whereby the determined content comprises content that shares a common genre or theme for each persona. At least some of the plurality of personas is then caused to be displayed to a user. By using embodiments of the present invention, a user can easily and more quickly discover and navigate to desired content that is relevant to them. Accordingly, one or more of the methodologies discussed herein may obviate a need for extended search and navigation of content catalogs, which may have the technical effect of reducing computing resources used by one or more devices within the system. Examples of such computing resources include, without limitation, processor cycles, network traffic, memory usage, storage space, and power consumption.

With reference to FIG. 1, an embodiment of an example environment 100 that enables providing content recommendations using personas is shown. In example embodiments, a digital receiver 102 of a user provides access to digital content. In one embodiment, the digital receiver 102 is a set-top box. The digital receiver 102 is coupled to a viewing device 104 (e.g., a television or monitor) on which the user can view the digital content. In some embodiments, the digital receiver 102 may be combined with the viewing device 104 (e.g., a smart television).

Since the user accesses the digital content through the digital receiver 102, the digital receiver 102 is configured to receive commands with respect to the digital content and user interfaces generated by the digital receiver 102. In example embodiments, the commands include instructions to navigate to content of interest using personas. The instructions cause the digital receiver 102 to, in accordance with one embodiment, update the user interface based on the commands. Accordingly, in one embodiment, a mechanism on a remote control device 112 is activated and sends a signal to the digital receiver 102 to control viewing of, and interaction with, the user interfaces. In example embodiments, the digital receiver 102 comprises logic to generate the user interfaces and dynamically update the user interfaces based on the commands.

In some embodiments, a headend 106 processes device data (e.g., user profile and viewing data) received from the digital receiver 102 and provides content data, over a network 108 to the digital receiver 102, to be used in presenting the recommendations using personas. The headend 106 comprises a control center (e.g., one or more servers) where various signals (e.g., associated with content) may be received, monitored, and processed. In particular, a persona engine 110 receives user behavior and profile information (also referred to as "device data") from the digital receiver 102 that indicates user interactions with various content (e.g., live content, video on demand (VOD), third party streamed content) and preferences. The persona engine 110 also accesses or receives data from one or more content providers 114 that may include a catalog of content available from each content provider 114. In some embodiments, the persona engine 110 dynamically creates one or more personas based on the device data. For example, the persona engine 110 may search for and weigh various content from the catalogs based on preferred genres or themes determined from the device data received from the digital receiver 102 to select the content (e.g., programs) to be recommended in particular personas determined to be relevant to the user. For example, if the user has watched five cooking related shows in the last week (or watched more cooking related shows than most other genres of shows), the persona engine 110 determines that the user has a preference for that genre of shows and may generate a cooking persona (e.g., Gourmet Girl) that includes cooking related content that may be of interest to the user. This embodiment provides more highly relevant content recommendations as the content can be tailored to the user. Additionally, example embodiments can tailor the recommendations to certain types of content within a genre. For example, the user may have a preference for cooking instructional shows but does not watch cooking reality competition shows. Therefore, the cooking persona generated for this user may only contain cooking instructional shows.

In other embodiments, the persona engine 110 creates a plurality of general personas before or after receiving the device data. These general personas may be less relevant then a tailored persona since, while it still revolves around a central theme (e.g., genre, actor, events such as the Olympics, seasonal event such as a holiday, mood, new releases), the content is chosen for a more general audience. Based on the preferences determined from the device data, the persona engine 110 selects one or more of the general personas and transmits content data to the digital receiver 102, over the network 108, to cause display of the general personas. Alternatively, the persona engine 110 may provide all the general personas to the digital receiver 102, and the digital receiver 102 determines which of the general personas to display to the user.

One or more portions of the network 108 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks. Any one or more portions of the network 108 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, each content provider 114 comprises a third party service (e.g., Netfix, Hulu, YouTube, Amazon) that stores and provides content, such as over-the-top (OTT) content, video-on-demand (VOD) content, or broadcast content, to the headend 106 or the digital receiver 102 via the network 108. The content comprises audio/video content (e.g., movies, television shows, videos).

It is noted that the environment 100 shown in FIG. 1 is merely an example. For instance, any number of content providers 114 may be embodied within the environment 100. Additionally, some components of the environment 100 may be combined. For example, the digital receiver 102 may be embodied within the viewing device 104 to form a single device (e.g., a smart television). Furthermore, operations discussed as occurring at the headend 106 may be performed at the digital receiver 102 or vice-versa.

Any of the systems or machines (e.g., databases, devices, servers) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 7, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines. Moreover, any two or more of the systems or machines illustrated in FIG. 1 may be combined into a single system or machine, and the functions described herein for any single system or machine may be subdivided among multiple systems or machines.

Figure 2:
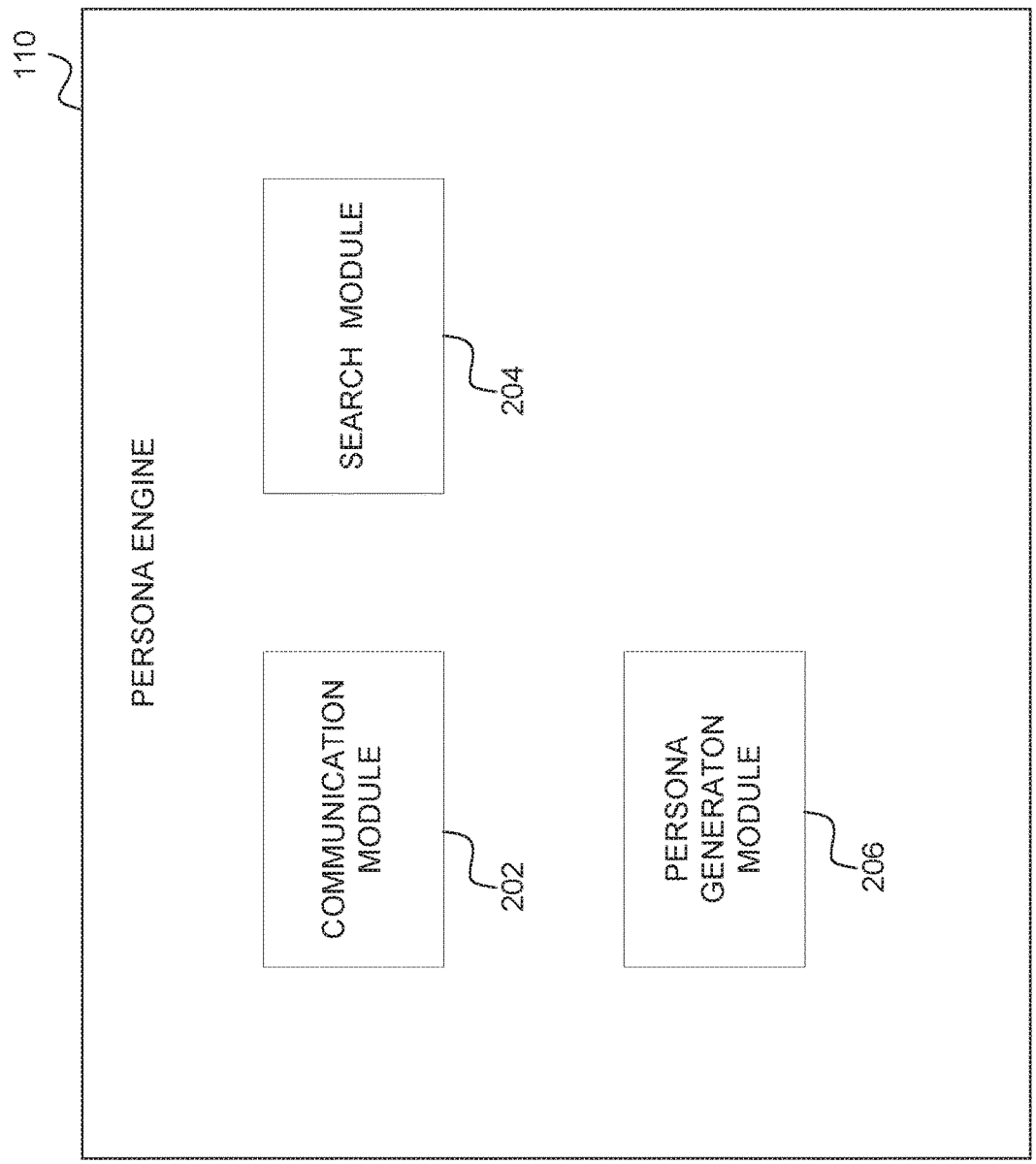
FIG. 2 is a block diagram illustrating an example embodiment of components within a persona engine in accordance with an example embodiment.

FIG. 2 is a block diagram illustrating an example embodiment of the persona engine 110 at the headend 106. In example embodiments, the persona engine 110 generates and provides personas with each persona having recommendations of content (e.g., in the form of a watchlist) that is themed to the persona. To enable these operations, the persona engine 110 comprises a communication module 202, a search module 204, and a persona generation module 206 all of which may be configured to communicate with each other (e.g., over a bus, shared memory, or a switch).

Any one or more of the components (e.g., modules) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices. For example, some of the components may be embodied within the headend 106 while others are embodied within the digital receiver 102. The persona engine 110 within the headend 106 may comprise other components not pertinent to example embodiments that are not shown or discussed.

The communication module 202 manages transmission of information for the persona engine 110. In example embodiments, the communication module 202 receives device data from the digital receiver 102, accesses catalogs of the content providers 114, and transmits content data to the digital receivers 102. The device data and data accessed from the catalogs are used by the personal engine 110 to generate and cause display of the personas and their respective watchlists. In one embodiment, the communication module 202 accesses a feed of a persona associated with a real-life person (e.g., a celebrity, critic) or entity (e.g., New York Times editorial) that may be posted, can be "followed," or otherwise made available via the network 108.

The search module 204 manages searches for relevant content at the headend 106. In example embodiments, the search module 204 searches the catalogs of the content providers 114 for relevant content with which to fill each persona. In some embodiments, the search module 204 may also access and search recorded content on the digital receiver 102, content that is manually placed on a watchlist by the user, or content that the user has otherwise shown interest in (e.g., user viewed previous episodes of a particular series). For example, the search module 204 can search for content related to cooking or food for a predetermined period of time (e.g., within the last six months, within the last three months and looking a week ahead) for a cooking related persona. Further still, the search module 204 can search for particular types of content. In the cooking persona example, the search module can search for content related to, for example, instructional cooking shows, cooking reality shows, or movies with cooking themes. The content may comprise live content (e.g., broadcast or network content), personal video recorder (PVR) content, video-on-demand (VOD), or third party service content.

The persona generation module 206 manages personas at the headend 106. In some embodiments, the persona generation module 206 defines a set of personas that may be used in the environment 100. In some embodiments, the persona generation module 206 receives search results from the search module 204 and creates general personas by selecting a number of pieces of content from the search results. For example, most popular content for a theme or genre, most highly rated content for the theme or genre, or a random selection of content for the theme or genre may be used to generate a watchlist for a persona. Content data representing the general personas may be sent to the digital receiver 102, and the digital receiver 102 may select personas to display (or display all of them). In some cases, the persona generation module 206 may select some of the general personas for transmission to the digital receiver 102 based on the device data of the user.

In embodiments where the persona engine 110 is enabled to generate customized personas, the persona generation module 206 uses the device data (e.g., user's watching habits) to weigh the search results and identify the pieces of content that are most relevant to the user (e.g., based on themes, genres, or programs most watched over a predetermined period of time). Based on these pieces of content, customized personas can be generated for the user and these pieces of content are used as the content in the watchlists for the customized personas. Therefore, each customized persona gives a feeling of a curated content list for the user. In some embodiments, the persona generation module 206 may determine genres or types of content that is more relevant to the user based on the device data prior to the search module 204 searching for content that matches the determined genre or types of content that is more relevant to the user.

Figure 3:
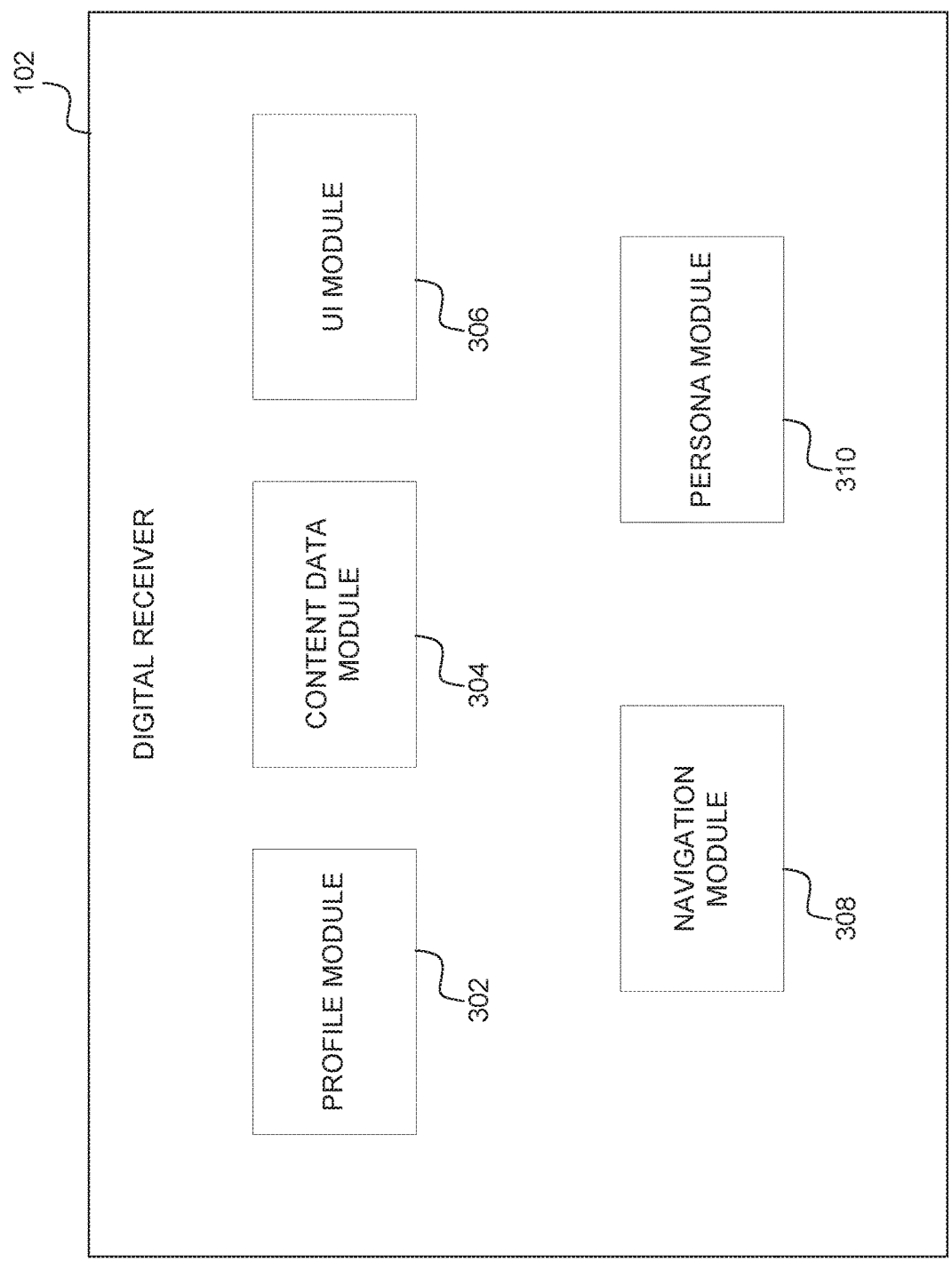
FIG. 3 is a block diagram illustrating an example embodiment of components within a digital receiver.

FIG. 3 is a block diagram illustrating an example embodiment of the digital receiver 102. In example embodiments, the digital receiver 102 generates and displays user interfaces comprising the personas. To enable these operations, the digital receiver 102 comprises a profile module 302, a content data module 304, a user interface (UI) module 306, a navigation module 308, and an optional persona module 310 all of which may be configured to communicate with each other (e.g., over a bus, shared memory, or a switch).

The profile module 302 manages the device data that indicates user behavior (e.g., actions performed by the user) at the digital receiver 102. For example, the device data may indicate programs the user has viewed or recorded, ratings that the user has provided, viewing preferences (e.g., genres, actors), or any other information that indicates user interaction with content at the digital receiver 102. In embodiments where the persona engine 110 at the headend 106 is used to generate the content data, the profile module 302 pushes the device data to the persona engine 110 via the network 108. The persona engine 110 uses the device data to determine recommendations to be included in each persona or select certain personas to be provided to the user.

The content data module 304 receives the content data that is used to cause display of the persona by the digital receiver 102. The content data includes, for example, an identification of each persona and recommendations or metadata for pieces of content in the watchlist for each persona received from the persona engine 110. In some embodiments, the content data may include a name of each piece of recommended content and details about the recommended content (e.g., season, episode, duration, rating, summary of content).

The user interface (UI) module 306 generates user interfaces for display of a content catalog available at the digital receiver 102 and display of personas. Example user interfaces generated by the user interface module 306 are discussed in connection with FIGS. 4A-4E. In example embodiments, the user interface module 208 generates, using the content data and upon request by the user, user interfaces that display the personas and content "watched" (e.g., the watchlist) for a selected persona.

A navigation module 308 receives user inputs and causes an appropriate update to the user interface. In some cases, the user input is a navigation of a catalog of available content for the digital receiver 102. The user input may also include a selection of a piece of content in the catalog, a persona, or a piece of content associated with the persona. Selection of a piece of content may trigger automatic playing of a corresponding program or links the digital receiver 102 to a detailed content view (e.g., media view) for the program corresponding to the selected piece of content. In some embodiments, selecting a particular piece of content cross-launches a third party service application (e.g., Netflix; Hulu) or a digital receiver application (e.g., for record VODs), and begins playback of the corresponding program in full screen. In embodiments where a deep link is not available, selection of the piece of content causes the digital receiver 102 to access and display a details content view (e.g., media view) for the selected content/program (e.g., an overview page for the piece of content). If the user is not a subscriber to a third party service that provides the selected piece of content, the user may be shown a user interface to subscribe to the third party service or to purchase rights to view the selected piece of content. In example embodiments, the user inputs are used to update the device data at the receiver 102.

The persona module 310 manages personas at the digital receiver 102. In some embodiments, logic for populating persona is located at the digital receiver 102 and not at the headend 106. In these embodiments, the persona module 310 takes device data from the profile module 302, accesses content available to the digital receiver 102 (e.g., catalog of content from the content providers 114 and recorded content at or coupled to the digital receiver 102), and identifies pieces of content that are relevant to the user. In embodiments where the persona is populated at the headend 106, the persona module 310 may select fewer than all of the personas received from the headend 106 for display (e.g., personas relevant to the user based on device data). In some embodiments where the persona is populated at the headend 106, the persona module 310 is optional or not needed at the digital receiver 102.

Figure 4A:
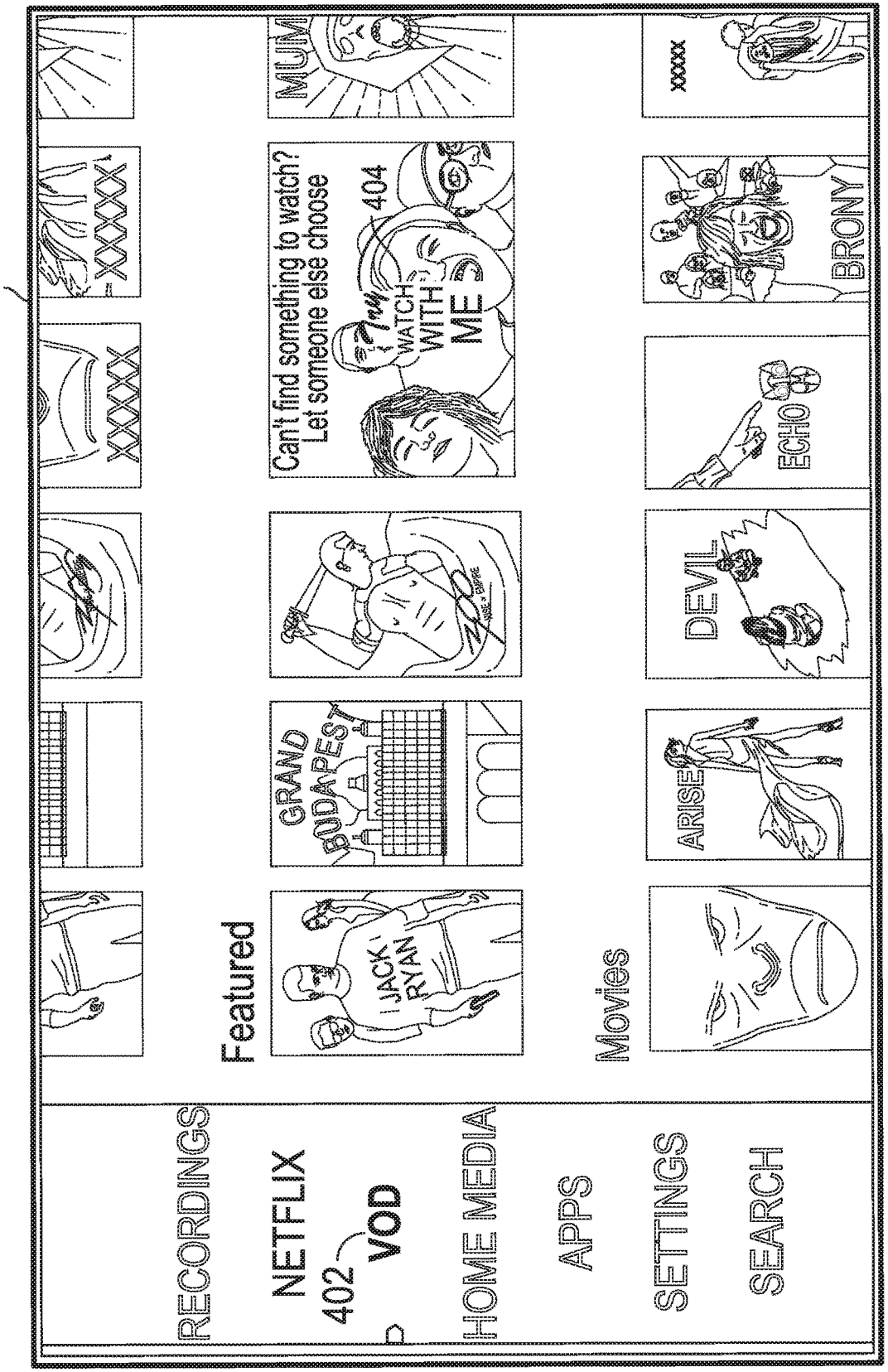
FIG. 4A-FIG. 4E are sample user interfaces illustrating a series of navigations involving personas.
Figure 4B:
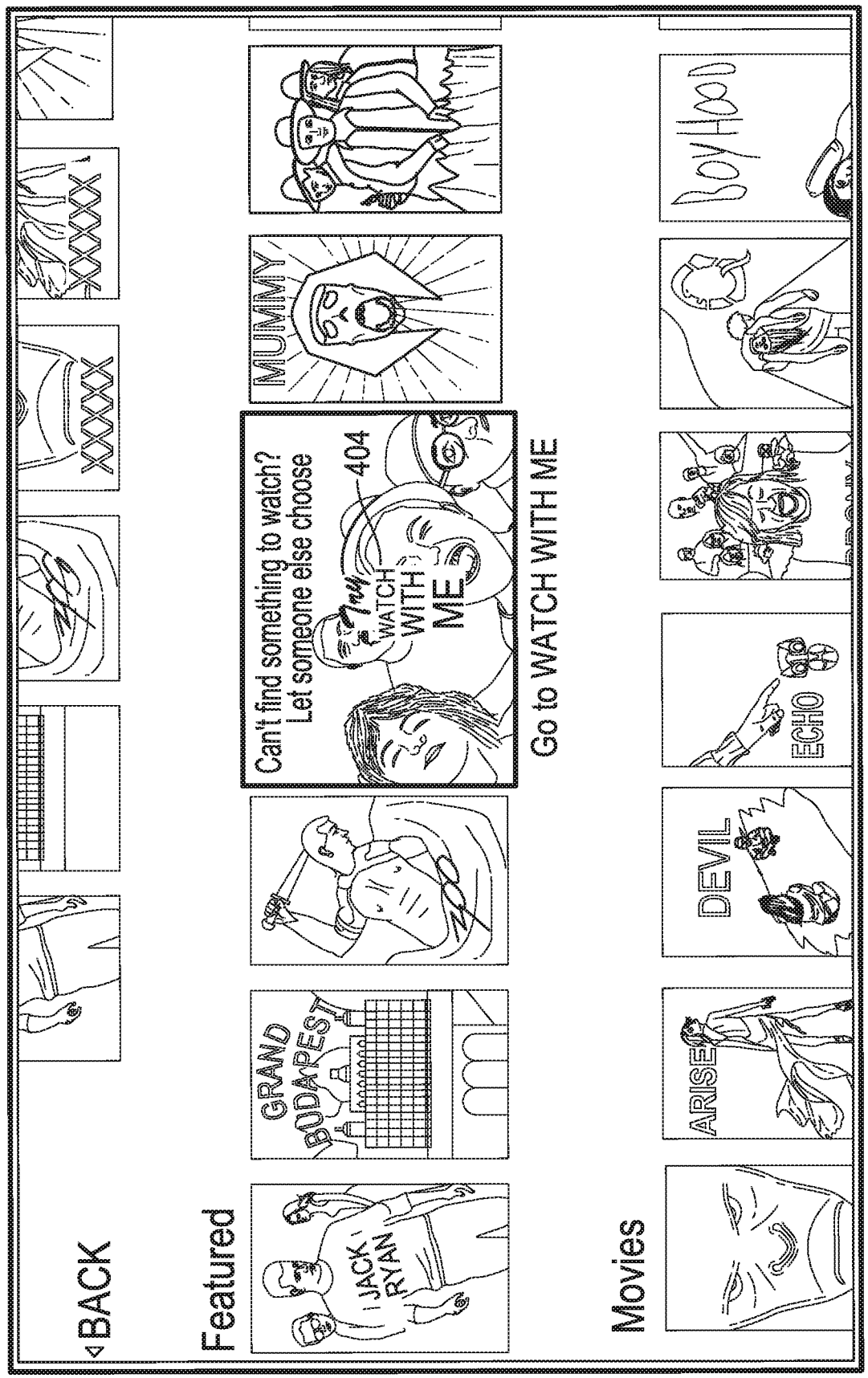

FIGS. 4A-4E are sample user interfaces displayed by the digital receiver 102 illustrating a series of navigations involving personas. Referring to FIG. 4A, a user interface (UI) displaying a catalog is shown. In example embodiments, the user interface module 306 generates and displays the UI 400 when the user starts exploring viewing options. In the example of FIG. 4A, the user has selected to view content available via a video-on-demand (VOD) selection 402. Among the content available is a "Watch With Me" selection 404. It is noted that the "Watch With Me" selection 404 may be located in other categories of the viewing options (e.g., Netflix, Home Media). When the user goes to the "Watch With Me" selection 404 (e.g., moves a cursor to the selection), the "Watch With Me" selection 404 is highlighted as shown in FIG. 4B. Using the remote control device 112, for example, the user can select the "Watch With Me" selection 404 (e.g., press "OK/Select" on the remote control device 112).

Figure 4C:
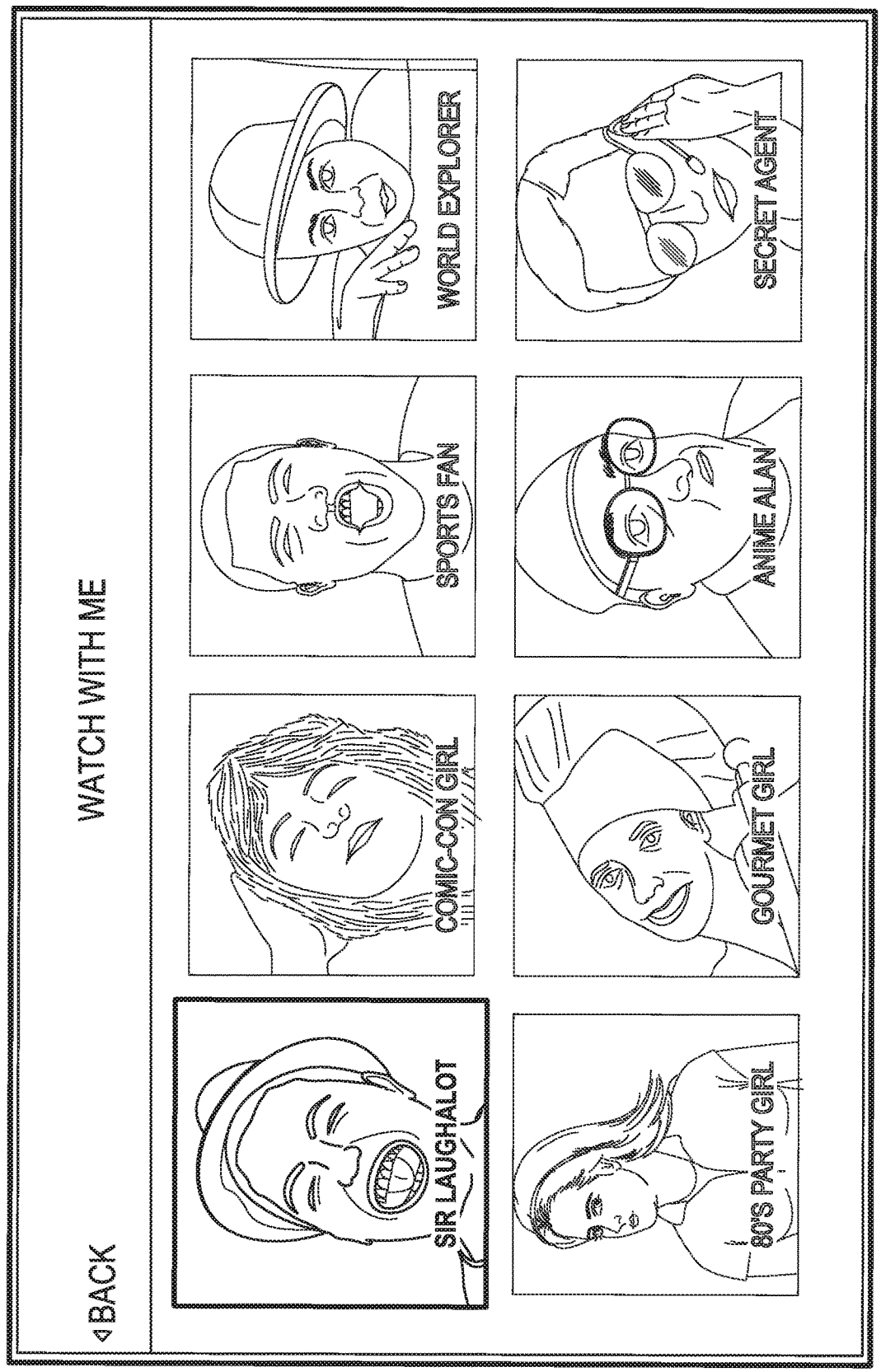

Selecting the "Watch With Me" selection 404 causes a new user interface or screen to be shown with available personas displayed as depicted in FIG. 4C. In some embodiments, the personas may comprise personas that "watch" content similar to what the user watches based on, for example, the device data managed by the profile module 302. In other embodiments, the personas may be a default or random set of general personas that is shown to users regardless of user preferences. The user may navigate to a persona that the user is interested in (e.g., using the remote control device 112 or via touch if the viewing device 104 is touchscreen enabled). For example, the user navigates to Gourmet Girl in FIG. 4D (e.g., as indicated by a highlight, bold, or visual distinction around the selected persona).

Figure 4D:
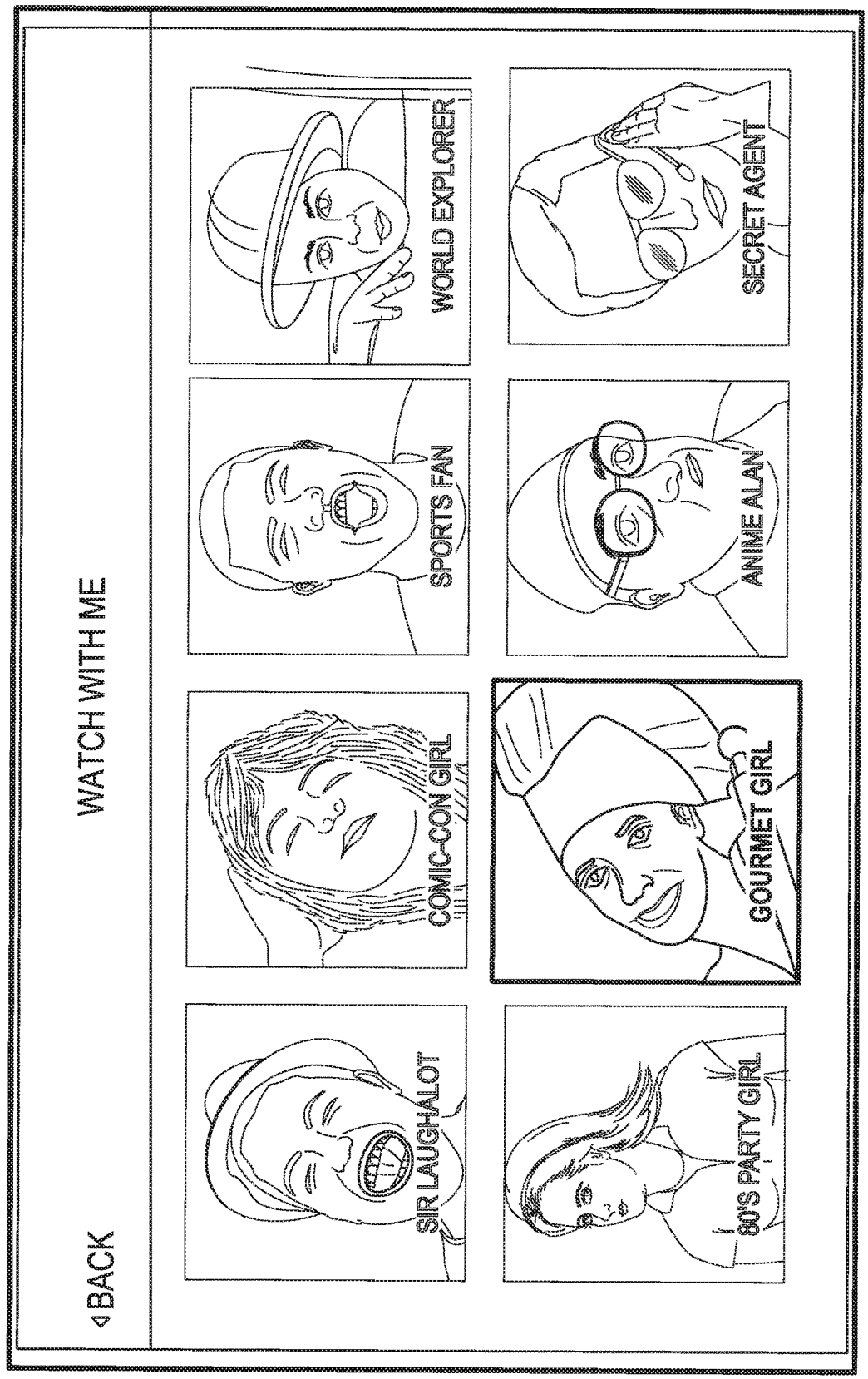
Figure 4E:
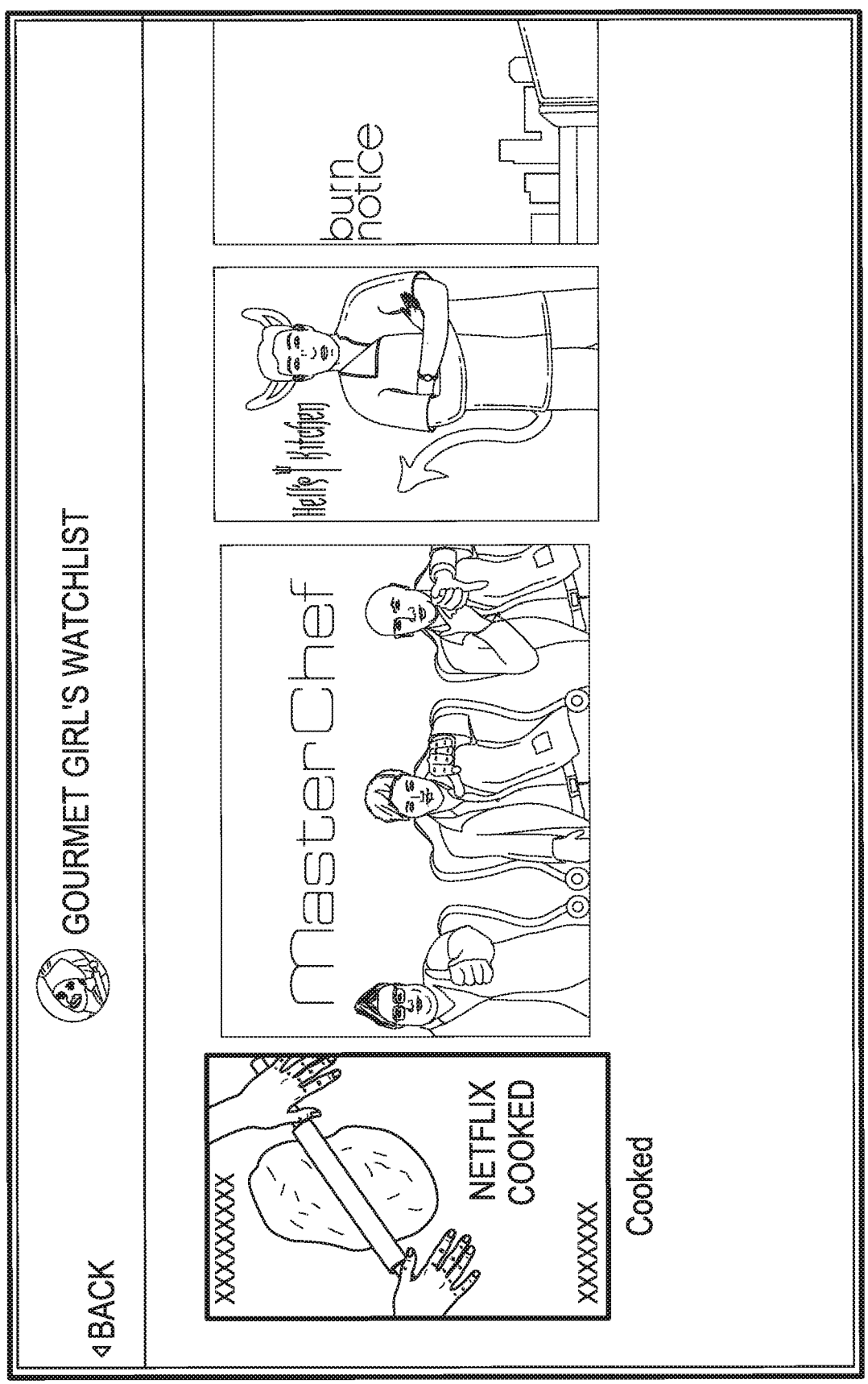

Upon selection of the persona, the persona's watchlist is shown. Referring now to FIG. 4E, a portion of Gourmet Girl's watchlist is shown. The watchlist comprises various pieces of content that are themed around the persona—in this case, food or cooking. The user may then select any piece of content in the watchlist, which will either cause immediate playing of the program/content or present a purchase page (e.g., if the content is not free or if the user is not a subscriber).

It is noted that FIGS. 4A-4E merely illustrate one embodiment of how personas may be displayed to the user. For example, an alternative embodiment may present the contents of a watchlist of a persona as a channel in an electronic program guide (EPG) or may present the "Watch With Me" selection as a channel in the EPG. In some embodiments, a persona that the user selects often may be made more prominent in the user interface (e.g., displayed first, highlighted, displayed as a channel in the EPG).

Figure 5:
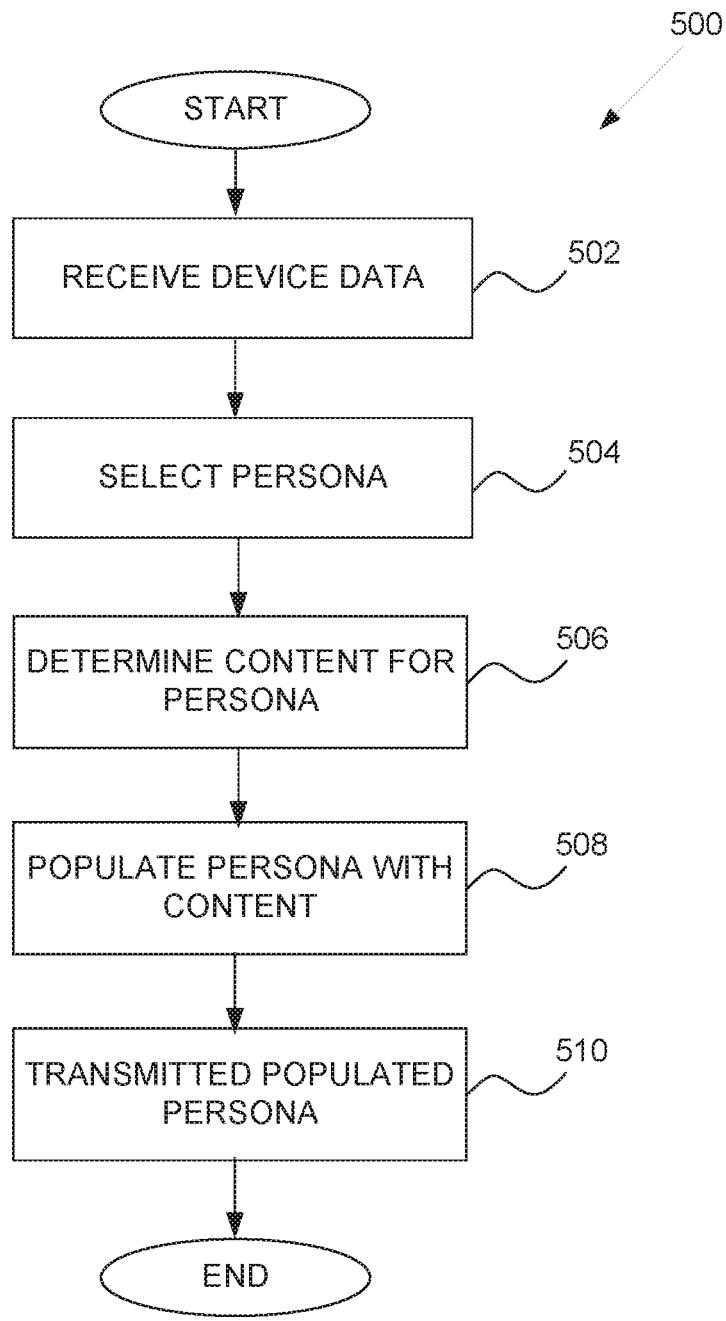
FIG. 5 is a flow diagram of an example method for determining and causing presentation of content recommendations using personas at the persona engine in accordance with an example embodiment.

FIG. 5 is a flow diagram of an example method 500 for determining and providing content recommendations using personas at the persona engine 110. In example embodiments, the method 500 is performed in part or in whole by components of the persona engine 110 at the headend 106. Accordingly, the method 500 is described by way of example with reference to the persona engine 110. However, it shall be appreciated that at least some of the operations of the method 500 may be deployed on various other hardware configurations or be performed by similar components residing elsewhere in the environment 100 (e.g., at the digital receiver 102). Therefore, the method 500 is not intended to be limited to the headend 106.

In operation 502, the communication module 202 receives device data (associated with a profile of the user) at the headend 106. The device data is indicative of a user's watching behavior and may indicate programs the user has viewed, recorded, rated, or placed on a watchlist; ratings that the user has provided; watching preferences (e.g., genres, actors, types of content); or any other information that indicates user interaction with content at the digital receiver 102. In some embodiments, the headend 106 uses the device data received from the digital receiver 102 to customize recommendations to be presented in customized) personas. In other embodiments, the headend 106 uses the device data to select general personas (e.g., from a plurality of general personas) to be shown to the user.

In operation 504, personas that match preferences or behaviors identified from the device data are selected by the persona generation module 206. Accordingly, the persona generation module 206 analyzes the device data to determine, for example, genre or types of content that the user most often views, records, or places on watchlists (e.g., types of programs most viewed by the user over a predetermined period of time) and selects corresponding personas (e.g., Gourmet Girl, Sports Fan, Anime Alan).

In operation 506, content for the selected personas is determined. In example embodiments, the search module 204 searches the catalogs of the content providers 114 for relevant content with which to populate each persona. In some embodiments, the search module 204 may also access and search recorded content on the digital receiver 102 and include the recorded content in the watchlist for a persona. The content may comprise live content (e.g., broadcast or network content), personal video recorder (PVR) content, video-on-demand (VOD), or third party service content. In some embodiments, the persona generation module 206 receives the search results from the search module 204 and determines the most relevant content to populate each selected persona with based on the device data. For example, the persona generation module 206 uses the device data to weigh the search results and identifies the pieces of content that are most relevant to the user. For example, for each type or genre of content, a counter or weight is increased for each piece of corresponding content interacted with by the user (e.g., viewed, recorded, placed on a watchlist). The weight is then used to determine the most relevant pieces of content (e.g., similar type or genre of content, further episodes of viewed or recorded content) to include in the watchlist for a persona. Those pieces of content are then used to populate each persona (e.g., generate a watchlist for each persona) in operation 508, and content data representing the customized personas is transmitted to the digital receiver 102 in operation 510.

In an embodiment where the persona engine 110 does not customize the content within each persona to the user at the digital receiver 102, the persona generation module 206 may populate these general personas with, for example, most popular content for the genre, most highly rated content for the genre, or a random selection of content for the genre. In some cases, the general personas may be prepopulated with content prior to receiving the device data from the digital receiver 102, and the persona generation module 206 merely selects the general personas in operation 504 that are likely to be relevant to the user, and transmits the content data representing the general personas in operation 510 to the digital receiver 102. In other embodiments, the personal engine 110 does not receive device data in operation 502. Instead, a plurality of personas may be transmitted in operation 510, and the digital receiver 102 may select the personas to display to the user.

Figure 6:
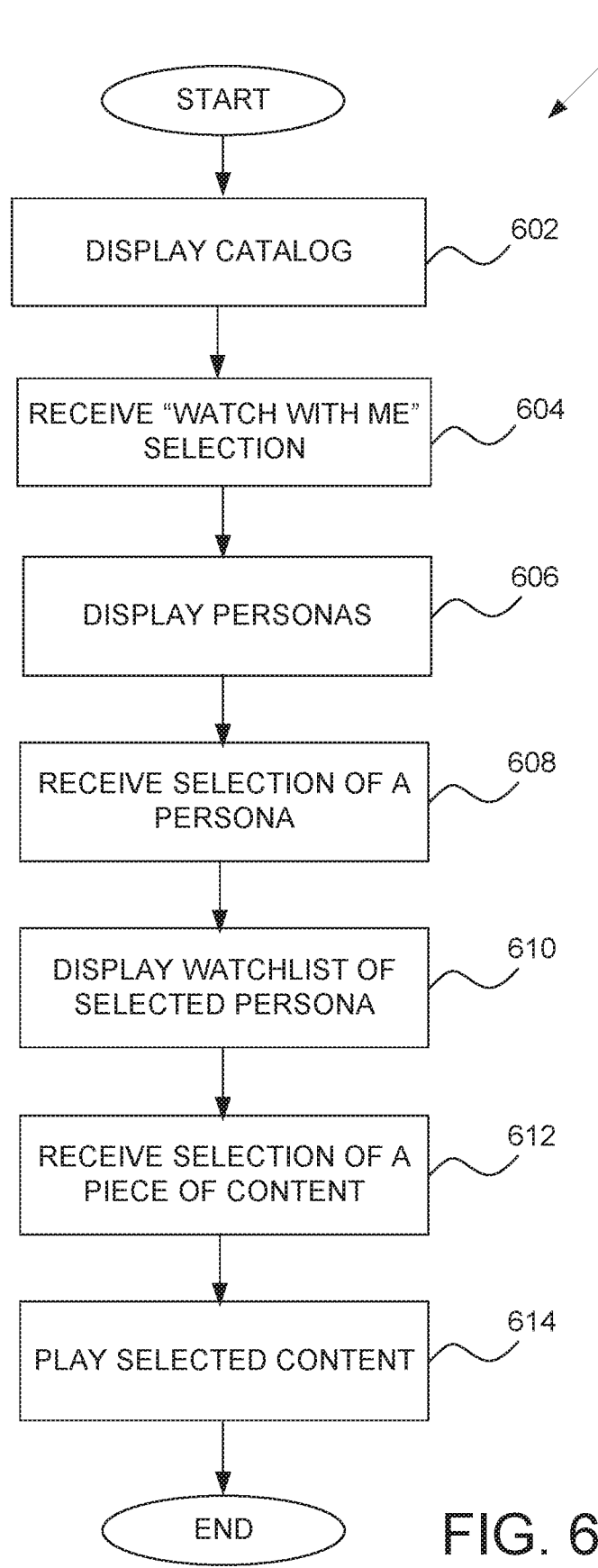
FIG. 6 is a flow diagram of an example method for accessing and displaying content recommendations using personas at the digital receiver in accordance with an example embodiment.

FIG. 6 is a flow diagram of an example method 600 for accessing and displaying content recommendations using personas at the digital receiver 102. In example embodiments, the method 600 is performed in part or in whole by components of the digital receiver 102. Accordingly, the method 600 is described by way of example with reference to the digital receiver 102. However, it shall be appreciated that at least some of the operations of the method 600 may be deployed on various other hardware configurations or be performed by similar components residing elsewhere in the environment 100. Therefore, the method 600 is not intended to be limited to the digital receiver 102.

In operation 602, a user interface displaying a catalog or list of available content accessible via the digital receiver 102 is caused to be displayed on the viewing device 104. In example embodiments, the user interface module 306 generates the user interface displaying the list and sends it to the viewing device 104. Ha 4A shows an example of this user interface.

In operation 604, the digital receiver 102 receives a "Watch With Me" selection or an equivalent type of selection (e.g., a selection to activate a persona watchlist option). In example embodiments, the navigation module 308 may receive one or more navigation inputs and a selection of the "Watch With Me" selection. For example, the user, using the remote control device 112, may navigate to an icon representing the "Watch With Me" selection as shown in FIG. 4B.

In operation 606, personas are caused to be displayed on the viewing device 104. In some embodiments, content data that indicates the personas to be displayed is received from the persona engine 110 by the content data module 304. The personas may be customized with recommended content, based on device data from the digital receiver 102, or be general personas. The content data may include a name of each piece of content and details about the content (e.g., season, episode, duration, rating, summary of content). In alternative embodiments, the persona module 310 at the digital receiver 102 may generate or select the personas to be displayed. In these embodiments, the persona module 310 accesses the device data from the profile module 302 and selects personas from a plurality of general personas obtained from the headend 106, or accesses the device data from the profile module 302 and generates (e.g., populates) personas with content that may be relevant based on the device data. The user interface module 306 generates the user interface displaying available personas and provides the user interface to the viewing device 104. FIG. 4C shows an example of such a user interface.

In operation 608, a selection of a persona is received by the navigation module 308. In example embodiments, the user navigates to a persona, as shown in FIG. 4D, and selects the persona.

In response, a user interface displaying a watchlist of content for the selected persona is shown in operation 610. In some cases, the user interface is generated by the user interface module 306 based on the content data received from the headend 106. An example of this user interface is shown in FIG. 4E.

In operation 612, a selection of a piece of content from the watchlist of the persona is received by the navigation module 308. The selection may trigger playing of the selected piece of content in operation 614. Alternatively, the selection may cause a user interface corresponding to a media page of the selected piece of content to be displayed or a purchase page for the piece of the selected piece of content to be displayed.

Figure 7:
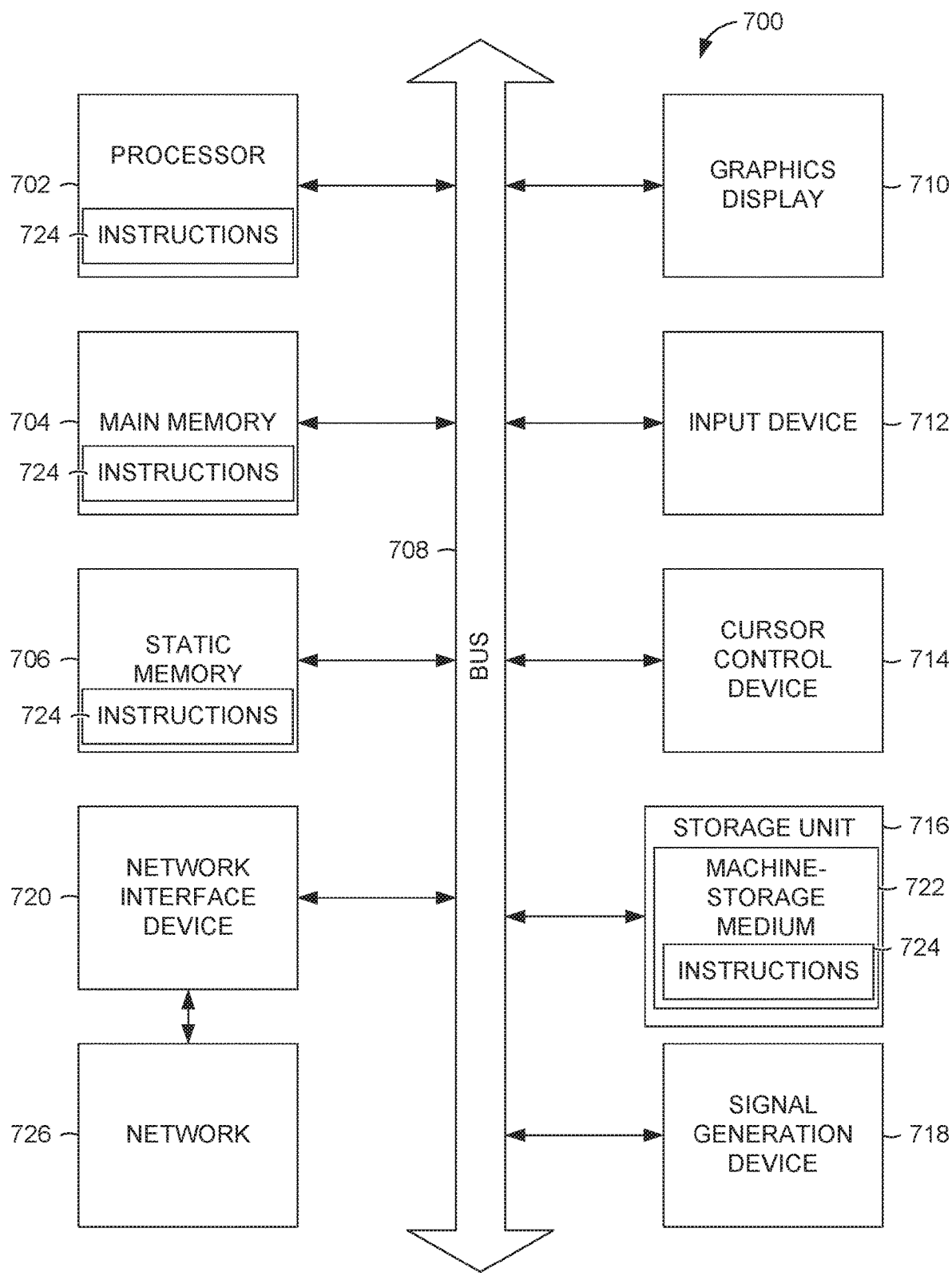
FIG. 7 is a diagrammatic representation of a machine in an example form of a computing system within which a set of instructions may be executed for causing the machine to perform any one or more of the methodologies discussed herein, according to an example embodiment.

FIG. 7 is a block diagram illustrating components of a machine 700, according to some example embodiments, able to read instructions 724 from a machine-storage medium 722 (e.g., a non-transitory machine-readable medium, a machine-readable storage medium, a computer-readable storage medium, or any suitable combination thereof) and perform any one or more of the methodologies discussed herein, in whole or in part. Specifically, FIG. 7 shows the machine 700 in the example form of a computer device (e.g., a computer) within which the instructions 724 (e.g., software, a program, an application, an applet, an app, or other executable code) for causing the machine 700 to perform any one or more of the methodologies discussed herein may be executed, in whole or in part.

For example, the instructions 724 may cause the machine 700 to execute the flow diagrams of FIGS. 5 and 6. The instructions 724 can transform the general, non-programmed machine 700 into a particular machine (e.g., specially configured machine) programmed to carry out the described and illustrated functions in the manner described.

In alternative embodiments, the machine 700 operates as a standalone device or may be connected (e.g., networked) to other machines. The machine 700 may be a server computer, a client computer, a personal computer (PC), a tablet computer, a laptop computer, a netbook, a set-top box (e.g. STB), a personal digital assistant (PDA), a cellular telephone, a smartphone, a web appliance, a network router, a network switch, a network bridge, a power adapter, or any machine 700 capable of executing the instructions 724, sequentially or otherwise, that specify actions to be taken by that machine 700. Further, while only a single machine 700 is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, a cathode ray tube (CRT), or any other display capable of displaying graphics or video). The machine 700 may also include an input device 712 (e.g., a keyboard or keypad), a cursor control device 714 (e.g., a mouse, a touchpad, a trackball, a joystick, a motion sensor, an eye tracking device, or other pointing instrument), a storage unit 716, a signal generation device 718 (e.g., a sound card, an amplifier, a speaker, a headphone jack, or any suitable combination thereof), and a network interface device 720.

The storage unit 716 includes the machine-storage medium on which are stored the instructions 724 embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered machine-storage media 722 (e.g., tangible and non-transitory machine-readable media). The instructions 724 may be transmitted or received over a network 726 (e.g., network 108) via the network interface device 720.

In some example embodiments, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" (referred to collectively as "machine-storage medium 722") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 722 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 722 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 724 may further be transmitted or received over a communications network 726 using a transmission medium via the network interface device 720 and utilizing any one of a number of well-known transfer protocols HTTP). Examples of communication networks 726 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium 722 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 702 or a group of processors 702) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

EXAMPLES

Example 1 is a method for generating and displaying groupings of content recommendations using personas. The method comprises determining content for each of the plurality of personas, the determined content for each of the plurality of personas comprising content that shares a common genre or theme for each persona; populating, by a hardware processor, each of the plurality of personas using the determined content for each of the plurality of personas; and causing display of at least some of the plurality of personas on a viewing device of a user, the at least some of the plurality of personas being selected for the user based on a device data corresponding to the user, the device data indicating user preferences and interactions with previous content.

In example 2, the subject matter of example 1 can optionally include receiving the device data corresponding to the user, wherein the determining the content for each of the plurality of personas comprises searching for and weighing various content based on preferred genres or types of content of the user determined from the device data, and wherein the at least some of the plurality of personas is customized to the user based on the device data.

In example 3, the subject matter of examples 1-2 can optionally include wherein the plurality of personas comprises a set of generic personas; and the causing display comprises selecting the at least some of the plurality of personas from the set of generic personas that are most relevant to the user based on the device data.

In example 4, the subject matter of examples 1-3 can optionally include wherein the determining the content comprises accessing a catalog of a content provider; and searching for the content that shares a common genre or theme for each of the plurality of personas.

In example 5, the subject matter of examples 1-4 can optionally include wherein the determining the content comprises accessing recorded content or content placed on a watchlist on a digital receiver of the user; and populating each of the plurality of personas comprises including the recorded content or content placed on the watchlist on the digital receiver in populating a persona sharing a common genre or theme with the recorded content or content placed on the watchlist on the digital receiver.

In example 6, the subject matter of examples 1-5 can optionally include wherein the determining the content comprises determining the most popular content for a theme or genre of a persona of the plurality of personas.

In example 7, the subject matter of examples 1-6 can optionally include wherein the determining the content comprises determining the most highly rated content for a theme or genre of a persona of the plurality of personas.

In example 8, the subject matter of examples 1-7 can optionally include wherein the populating each of the plurality of personas comprises populating a persona with a type of content for the common genre or theme.

In example 9, the subject matter of examples 1-8 can optionally include accessing a feed of a persona associated with a real-life person; and including the feed of the persona associated with the real-life person in the at least some of the plurality of personas.

In example 10, the subject matter of examples 1-9 can optionally include in response to receiving a selection of one of the at least some of the plurality of personas, causing presentation of a corresponding watchlist for the selected one of the at least some of the plurality of personas.

Example 11 is a system for generating and displaying groupings of content recommendations using personas. The system includes one or more processors and a memory storing instructions that, when executed by the one or more hardware processors, causes the one or more hardware processors to perform operations comprising determining content for each of a plurality of personas, the determined content for each of the plurality of personas comprising content that shares a common genre or theme for each persona; populating each of the plurality of personas using the determined content for each of the plurality of personas; and causing display of at least some of the plurality of personas on a viewing device of a user, the at least some of the plurality of personas being selected for the user based on a device data corresponding to the user, the device data indicating user preferences and interactions with previous content.

In example 12, the subject matter of example 11 can optionally include receiving the device data corresponding to the user, wherein the determining the content for each of the plurality of personas comprises searching for and weighing various content based on preferred genres or types of content of the user determined from the device data, and wherein the at least some of the plurality of personas is customized to the user based on the device data.

In example 13, the subject matter of examples 11-12 can optionally include wherein the plurality of personas comprises a set of generic personas; and the causing display comprises selecting the at least some of the plurality of personas from the set of generic personas that are most relevant to the user based on the device data.

In example 14, the subject matter of examples 11-13 can optionally include wherein the determining the content comprises accessing a catalog of a content provider; and searching for the content that shares a common genre or theme for each of the plurality of personas.

In example 15, the subject matter of examples 11-14 can optionally include wherein the determining the content comprises accessing recorded content or content placed on a watchlist on a digital receiver of the user; and populating each of the plurality of personas comprises including the recorded content or content placed on the watchlist on the digital receiver in populating a persona sharing a common genre or theme with the recorded content or content placed on the watchlist on the digital receiver.

In example 16, the subject matter of examples 11-15 can optionally include wherein the determining the content comprises determining the most popular content for a theme or genre of a persona of the plurality of personas.

In example 17, the subject matter of examples 11-16 can optionally include wherein the determining the content comprises determining the most highly rated content for a theme or genre of a persona of the plurality of personas.

In example 18, the subject matter of examples 11-17 can optionally include wherein populating each of the plurality of personas comprises populating a persona with a type of content for the common genre or theme.

In example 19, the subject matter of examples 11-18 can optionally include accessing a feed of a persona associated with a real-life person; and including the feed of the persona associated with the real-life person in the at least some of the plurality of personas.

Example 20 is a machine-storage medium for generating and displaying groupings of content recommendations using personas. The machine-storage medium configures one or more processors to perform operations comprising determining content for each of the plurality of personas, the determined content for each of the plurality of personas comprising content that shares a common genre or theme for each persona; populating each of the plurality of personas using the determined content for each of the plurality of personas; and causing display of at least some of the plurality of personas on a viewing device of a user, the at least some of the plurality of personas being selected for the user based on a device data corresponding to the user, the device data indicating user preferences and interactions with previous content.

Although an overview of the inventive subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   selecting, by a system, content for a persona, the content selected based on an interest of a character defining the persona, the selected content for the persona comprising first video content that shares a genre or theme corresponding to the interest of the character defining the persona;
   detecting video content previously selected by a user for later viewing;
   identifying, from among the video content previously selected by the user for later viewing, second video content that share the genre or theme corresponding to the interest of the character defining the persona, the second video content being different from the first video content;
   generating, by a hardware processor of the system, a watchlist for the persona by combining the first video content of the persona and the identified second video content that shares the genre or theme corresponding to the interest of the character defining the persona; and
   causing display of the persona on a viewing device of the user, the persona being selected for display to the user based on device data indicating a preference of the user, the persona being selectable to cause a display of the watchlist generated for the persona.

2. The method of claim 1, further comprising receiving the device data corresponding to the user, wherein the selecting the content for the persona comprises searching for and weighing various content based on preferred genres or types of content of the user determined from the device data, and wherein the persona is customized to the user based on the device data.

3. The method of claim 1, wherein:
   the persona comprises a generic persona; and
   the causing display comprises selecting the persona based on the persona being most relevant to the user based on the device data.

4. The method of claim 1, wherein the selecting the content comprises:
   accessing a catalog of a content provider; and
   searching for the content that shares the genre or theme corresponding to the interest of the character defining the persona.

5. The method of claim 1, wherein the detecting video content previously selected by a user for later viewing comprises accessing content placed on a user watchlist on a digital receiver of the user.

6. The method of claim 1, wherein the selecting the content comprises determining the most popular content for the theme or genre corresponding to the interest of the character defining the persona.

7. The method of claim 1, wherein the selecting the content comprises determining the most highly rated content for the theme or genre corresponding to the interest of the character defining the persona.

8. The method of claim 1, wherein the generating the watchlist for the persona comprises generating the watchlist for the persona with a type of content for the genre or theme.

9. The method of claim 1, further comprising:
accessing a feed of a persona associated with a real-life person; and
including the feed of the persona associated with the real-life person in a watchlist for a second persona displayed to the user.

10. The method of claim 1, further comprising, in response to receiving a selection of the persona, causing presentation of the watchlist for the persona.

11. A system comprising:
one or more hardware processors; and
memory storing instructions, that when executed by the one or more hardware processors, cause the one or more hardware processors to perform operations comprising:
selecting content for a persona, the content selected based on an interest of a character defining the persona, the selected content for the persona comprising first video content that shares a genre or theme corresponding to the interest of the character defining the persona;
detecting video content previously selected by a user for later viewing;
identifying, from among the video content previously selected by the user for later viewing, second video content that share the genre or theme corresponding to the interest of the character defining the persona, the second video content being different from the first video content;
generating a watchlist for the persona by combining the first video content of the persona and the identified second video content that shares the genre or theme corresponding to the interest of the character defining the persona; and
causing display of the persona on a viewing device of the user, the persona being selected for display to the user based on device data indicating a preference of the user, the persona being selectable to cause a display of the watchlist generated for the persona.

12. The system of claim 11, wherein the operations further comprise receiving the device data corresponding to the user, wherein the selecting the content for the persona comprises searching for and weighing various content based on preferred genres or types of content of the user determined from the device data, and wherein the persona is customized to the user based on the device data.

13. The system of claim 11, wherein:
the persona comprises a generic persona; and
the causing display comprises selecting the persona based on the persona being most relevant to the user based on the device data.

14. The system of claim 11, wherein the selecting the content comprises:
accessing a catalog of a content provider; and
searching for the content that shares the genre or theme corresponding to the interest of the character defining the persona.

15. The system of claim 11, wherein the detecting video content previously selected by a user for later viewing comprises accessing recorded content on a digital receiver of the user.

16. The system of claim 11, wherein the selecting the content comprises determining the most popular content for the theme or genre corresponding to the interest of the character defining the persona.

17. The system of claim 11, wherein the selecting the content comprises determining the most highly rated content for the theme or genre corresponding to the interest of the character defining the persona.

18. The system of claim 11, wherein the generating the watchlist for the persona comprises populating the persona with a type of content for the genre or theme.

19. The system of claim 11, wherein the operations further comprise:
accessing a feed of a persona associated with a real-life person; and
including the feed of the persona associated with the real-life person in a watchlist for a second persona displayed to the user.

20. A machine-storage medium storing instructions that when executed by one or more hardware processors of a machine, cause the machine to perform operations comprising:
selecting content for a persona, the content selected based on an interest of a character defining the persona, the selected content for the persona comprising first video content that shares a genre or theme corresponding to the interest of the character defining the persona;
detecting video content previously selected by a user for later viewing;
identifying, from among the video content previously selected by the user for later viewing, second video content that share the genre or theme corresponding to the interest of the character defining the persona, the second video content being different from the first video content;
generating a watchlist for the persona by combining the first video content of the persona and the identified second video content that shares the genre or theme corresponding to the interest of the character defining the persona; and
causing display of the persona on a viewing device of the user, the persona being selected for display to the user based on a device data indicating a preference of the user, the persona being selectable to cause a display of the watchlist generated for the persona.

* * * * *